(12) United States Patent
Kelley et al.

(10) Patent No.: US 6,295,568 B1
(45) Date of Patent: Sep. 25, 2001

(54) METHOD AND SYSTEM FOR SUPPORTING MULTIPLE LOCAL BUSES OPERATING AT DIFFERENT FREQUENCIES

(75) Inventors: Richard Allen Kelley, Apex, NC (US); Danny Marvin Neal, Round Rock; Steven Mark Thurber, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/055,414

(22) Filed: Apr. 6, 1998

(51) Int. Cl.[7] .............................. G06F 13/38; G06F 13/40
(52) U.S. Cl. .................. 710/126; 710/101; 710/109; 710/128; 710/131; 710/129
(58) Field of Search .................................. 710/101, 128, 710/109, 131, 126, 129

(56) References Cited

U.S. PATENT DOCUMENTS 5,764,968 * 6/1998 Ninomiya .............................. 713/601
5,983,297 * 11/1999 Noble et al. .......................... 710/102
6,081,863 * 6/2000 Kelley et al. ......................... 710/129

* cited by examiner

Primary Examiner—Rupal Dharia
(74) Attorney, Agent, or Firm—Volel Emile; Bracewell & Patterson, L.L.P.

(57) ABSTRACT

A method and system for supporting multiple Peripheral Component Interconnect (PCI) local buses through a single PCI host bridge having multiple PCI interfaces within a data-processing system are disclosed. In accordance with the method and system of the present invention, a processor and a system memory are connected to a system bus. One or more PCI local buses are connected to the system bus through a single PCI host bridge having bus and frequency control logic and bus clocks. The PCI local buses include sets of in-line electronic switches, dividing each PCI local bus into PCI local bus segments for supporting more PCI peripheral component slots then are called out by the PCI local bus standard. The sets of in-line electronic switches are open and closed in accordance with the bus and frequency control logic within the PCI host bridge thereby allowing the PCI peripheral component slots to operate at different bus frequencies, including bus frequencies higher than 66 MHz by using the bus clocks. The sets of in-line electronic switches further allowing different bus segments on the same PCI logical bus to dynamically be operated at different frequencies.

21 Claims, 3 Drawing Sheets

Fig. 2 *Prior Art*

METHOD AND SYSTEM FOR SUPPORTING MULTIPLE LOCAL BUSES OPERATING AT DIFFERENT FREQUENCIES

BACKGROUND OF THE INVENTION

1. Technical Field

The present invention relates in general to a method and system for data processing and, in particular, to a method and system for allowing multiple Peripheral Component Interconnect (PCI) adapter slots on the same PCI bus to be operated simultaneously at different clock frequencies within a computer system. Still more particularly, the present invention relates to a method and system for handling multiple PCI adapter slots on the same PCI bus to be operated at bus frequencies higher than 66 MHz.

2. Description of the Related Art

A computer system typically includes several types of buses, such as a system bus, local buses, and peripheral buses. Various electronic circuit devices and components are connected with each other via these buses such that intercommunication may be possible among all of these devices and components.

In general, a central processing unit (CPU) is attached to a system bus, over which the CPU communicates directly with a system memory that is also attached to the system bus. In addition, a local bus may be used for connecting certain highly integrated peripheral components rather than a slower standard expansion bus. One such local bus is known as the Peripheral Component Interconnect (PCI) bus. Under the PCI local bus standard, peripheral components can directly connect to a PCI local bus without the need for glue logic, the "profusion of chips needed to match the signals between different integrated circuits." Thus, PCI provides a bus standard on which high-performance peripheral devices, such as graphics devices and hard disk drives, can be coupled to the CPU, thereby permitting these high-performance peripheral devices to avoid the general access latency and the bandwidth constraints that are associated with an expansion bus. An expansion bus such as an Industry Standard Architecture (ISA) bus is for connecting various peripheral devices to the computer system. These peripheral devices typically include input/output (I/O) devices such as a keyboard, floppy drives, and printers.

In accordance with the PCI local bus standard for 33 MHz operation, only four peripheral component connector slots may be attached to a PCI bus due to loading constraints on the bus. Similarly, under the PCI local bus standard for 66 MHz operation, only two peripheral component connector slots may be attached to a PCI bus. In order to overcome this technical constraint, designers may add a second or more PCI local buses that give the end user of a computer system the advantage of adding on more slots per bus. However, a PCI host bridge is required for transferring information from the PCI bus to the system bus. Therefore, with the addition of more than one PCI local buses, designers have had to add on multiple PCI host bridges and/or PCI-to-PCI bridges for supporting the multiple PCI buses, thereby increasing the cost and complexity of the system.

The PCI local bus standard is defined to be processor independent, thereby enabling efficient transition to future processor generations having different clock frequencies. Processor independence has the added advantage of allowing the PCI local bus to be optimized for I/O functions, enabling concurrent operation of the local bus with the processor/memory subsystem, and accommodating multiple high performance peripherals. To accommodate these high performance peripherals, the current PCI local bus standard calls out for 66 MHz bus operation having forward and backward compatibility (doubling the bandwidth capabilities of the current 33 MHz definition.) However, there is a limitation in that a 66 MHz PCI device operates as a 33 MHz PCI device when it is connected to a 33 MHz PCI bus. To overcome this technical constraint, designers in the past have added a second PCI local bus having its own independent clock frequency, thereby allowing the end user to take advantage of adding in 66 MHz PCI devices. Additionally, it is envisioned that there will be a movement to enhance video and multimedia displays (i.e., HDTV and 3-D graphics) and other high bandwidth I/O, which will increase the local bus bandwidth requirements beyond 66 MHz.

Therefore, it is desirable in a PCI-based system requiring multiple PCI host bridges and/or PCI-to-PCI bridges supporting multiple PCI buses, that a single PCI host bridge support the multiple PCI buses thus minimizing the number of required bridges. Furthermore, it is desirable to have a single PCI host bridge that supports both 33 MHz and 66 MHz bus operation having more PCI peripheral component slots on a PCI bus than is defined by the PCI local bus standard. Lastly, it is desirable to allow different PCI devices on the same or different PCI buses to be operated at different frequencies, including bus frequencies higher than 66 MHz, while still maintaining backward compatibility as defined by the current PCI bus architecture. The subject invention herein solves all of these problems in a new and unique manner which has not been part of the art previously.

SUMMARY OF THE INVENTION

In view of the foregoing, it is therefore an object of the present invention to provide an improved method and system for data processing.

It is another object of the present invention to provide an improved method and system for handling multiple PCI local buses operating at different frequencies, including frequencies higher than 66 MHz within a data processing system.

It is yet another object of the present invention to provide an improved method and system for supporting more PCI peripheral component slots operating at different frequencies than is defined by the PCI local bus standard on a single PCI bus within a data-processing system.

In accordance with the method and system of the present invention, a processor and a system memory are connected to a system bus. A plurality of PCI local buses or local buses are connected to the system bus through a single PCI host bridge having bus and frequency control logic and bus clocks. The PCI local buses include sets of in-line electronic switches, dividing each PCI local bus into PCI local bus segments for supporting more PCI peripheral component slots then are called out by the PCI local bus standard. The sets of in-line electronic switches are open and closed in accordance with the bus and frequency control logic within the PCI host bridge thereby allowing the PCI peripheral component slots to operate at different bus frequencies, including bus frequencies higher than 66 MHz by using the bus clocks.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention may be applicable in a variety of computers under a number of different operating systems. The computer may be, for example, a personal computer, a mini-computer, or a mainframe computer. For the purpose of illustration, a preferred embodiment of the present invention, as described below, is implemented on a mini-computer (such as the RS/6000 series manufactured by International Business Machines Corporation).

Figure 1:
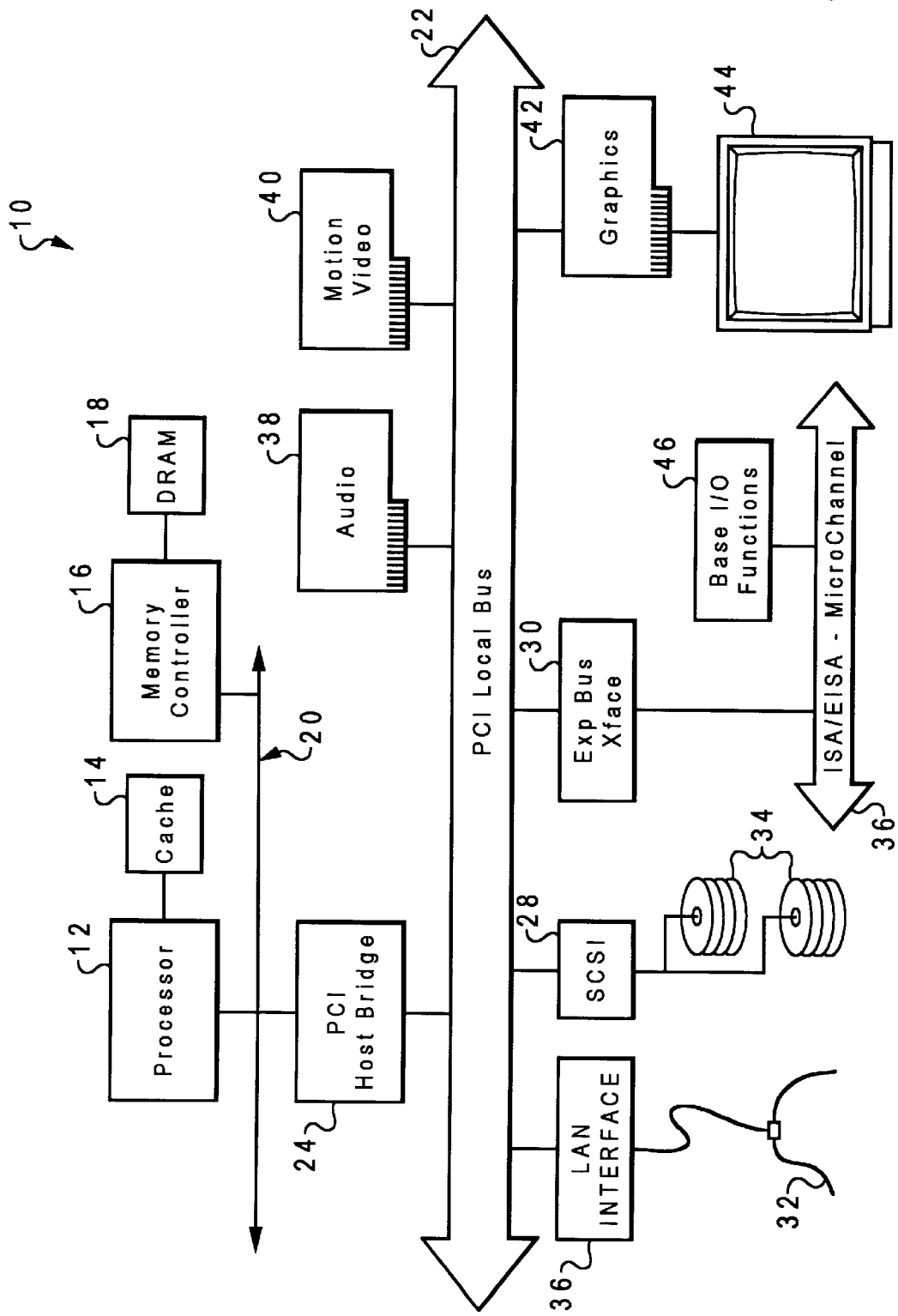
FIG. 1 is a block diagram of a typical computer system having a PCI local bus architecture, which may utilize a preferred embodiment of the present invention.

Referring now to the drawings, wherein like reference numerals refer to like and corresponding parts throughout, and in particular to FIG. 1, there is depicted a block diagram of a typical computer system 10 having a PCI local bus or any local bus architecture, which may have a number of different clock frequencies up to 66 MHz and above, which may utilize a preferred embodiment of the present invention. As shown in FIG. 1, a processor 12, cache memory 14, memory controller 16, and a Dynamic Random Access Memory (DRAM) 18 are all connected to a system bus 20 of a computer system 10. Processor 12, cache memory 14, memory controller 16, and DRAM 18 are also coupled to a PCI local bus 22 of computer system 10 through a PCI host bridge 24. PCI host bridge 24 provides a low latency path through which processor 12 may directly access PCI devices mapped anywhere within bus memory and/or I/O address spaces. PCI host bridge 24 also provides a high bandwidth path for allowing a PCI device to directly access DRAM 18. By way of example, but not of limitation, the PCI host bridge 24 may include various functions such as data buffering/posting and arbitration.

Referring once again to FIG. 1, also attaching to PCI local bus 22 may be other devices such as a local-area network (LAN) interface 26, a small computer system interface (SCSI) 28 and an expansion bus interface 30. LAN interface 26 is for connecting computer system 10 to a local-area network 32 such as to an Ethernet or Token-Ring. SCSI interface 28 is utilized to control high-speed SCSI disk drives 34. Expansion bus interface 30 couples any other expansion buses 36 such as an ISA bus, EISA bus, and/or MicroChannel Architecture (MCA) bus to the PCI local bus 22. Typically, various peripheral devices for performing certain basic I/O functions 46 are attached to one of expansion buses 36.

In general, PCI local bus 22, due to loading effects at 33 MHz of operation on the bus, supports up to four add-in board connectors without requiring any expansion capability, such as adding a second PCI local bus not shown. Audio adapter board 38, motion video adapter board 40, and graphics adapter board 42 connected to a monitor 44 are examples of some devices that may be attached to PCI local bus 22 via add-in board connectors as shown in FIG. 1. Additionally, the PCI local bus 22 may also have a maximum clock speed of 66 MHz and above to provide connectivity to very high bandwidth devices and applications such as HDTV, 3-D graphics and advanced video. However, PCI local bus 22, due to loading effects at 66 MHz of operation, only supports up to two add-in board connectors without requiring additional expansion capability.

Figure 2:
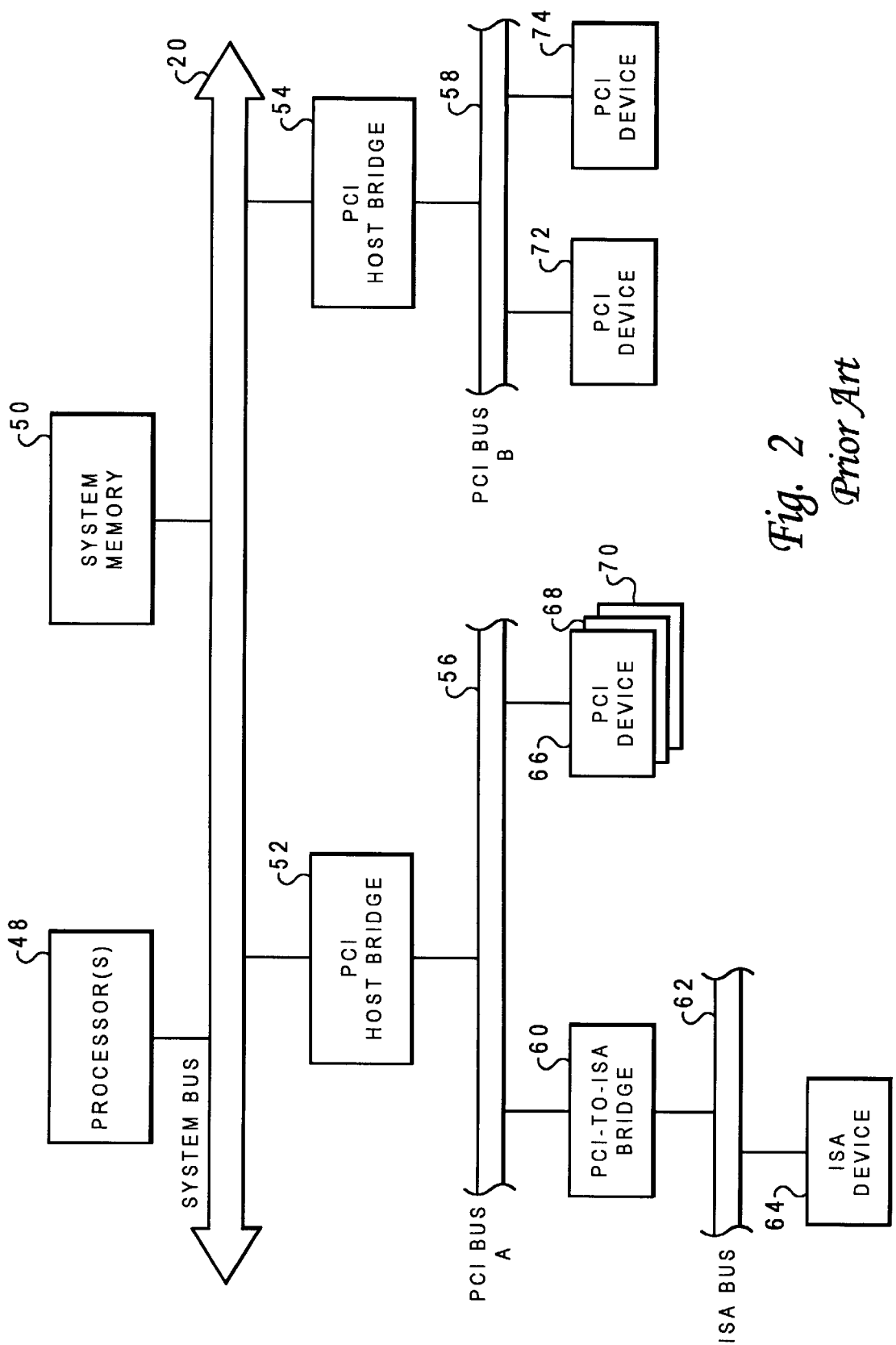
FIG. 2 is a block diagram of a prior art configuration having separate PCI local buses under separate PCI host bridges.

With reference now to FIG. 2, there is illustrated a prior art configuration having separate PCI local buses under separate PCI host bridges for supporting different clock frequencies. As shown, processor(s) 48 and a system memory 50 are coupled for communication over a system bus 20. By way of example, but not of limitation, system bus 20 provides a 32-bit memory address space and a 16-bit I/O address space. A PCI host bridge 52 enables communications between bus agents coupled to system bus 20 and bus agents coupled to a PCI local bus A 56 operating at a bus frequency up to 33 MHz. Further, a PCI-to-ISA bridge 60 enables communications between bus agents (ISA device 64) coupled to an ISA bus 62 (ISA bus 62 is an expansion bus) and system memory 50. PCI-to-ISA bridge 60 also enables communications between processor(s) 48 and bus agents (ISA device 64) coupled to the ISA bus 62.

Referring once again to FIG. 2, PCI devices 66, 68 and 70 are bus agents operating at a bus frequency up to 33 MHz coupled for communication over PCI local bus A 56. In addition, PCI host bridge 52 and PCI-to-ISA bridge 60 are coupled as bus agents for communication over PCI local bus 56. PCI host bridge 52 and PCI-to-ISA bridge 60 have the capability to be initiators and targets for access cycles over PCI local bus 56. Turning once again to FIG. 2, in addition to PCI host bridge 52, a second PCI host bridge 54 is also attached to the system bus 20 and may support a 66 MHz clock frequency signal. Similar to PCI host bridge 52, PCI host bridge 54 enables communications between bus agents coupled to system bus 20 and bus agents operating at a bus frequency up to 66 MHz coupled to a second PCI local bus B 58. Attaching to PCI local bus B 58 are 66 MHz PCI devices, such as PCI device 72 and PCI device 74. It should be noted that installing PCI device 72 onto PCI local bus A 56, the 66 MHz PCI device 72 operates as a 33 MHz PCI device due to the frequency constraints of PCI local bus A 56. Additionally, if any 33 MHz PCI devices 66, 68, or 70 are connected to the 66 MHz PCI bus B 58, bus B 58 and the devices attached to it are then restricted to operate at a maximum of 33 MHz.

Figure 3:
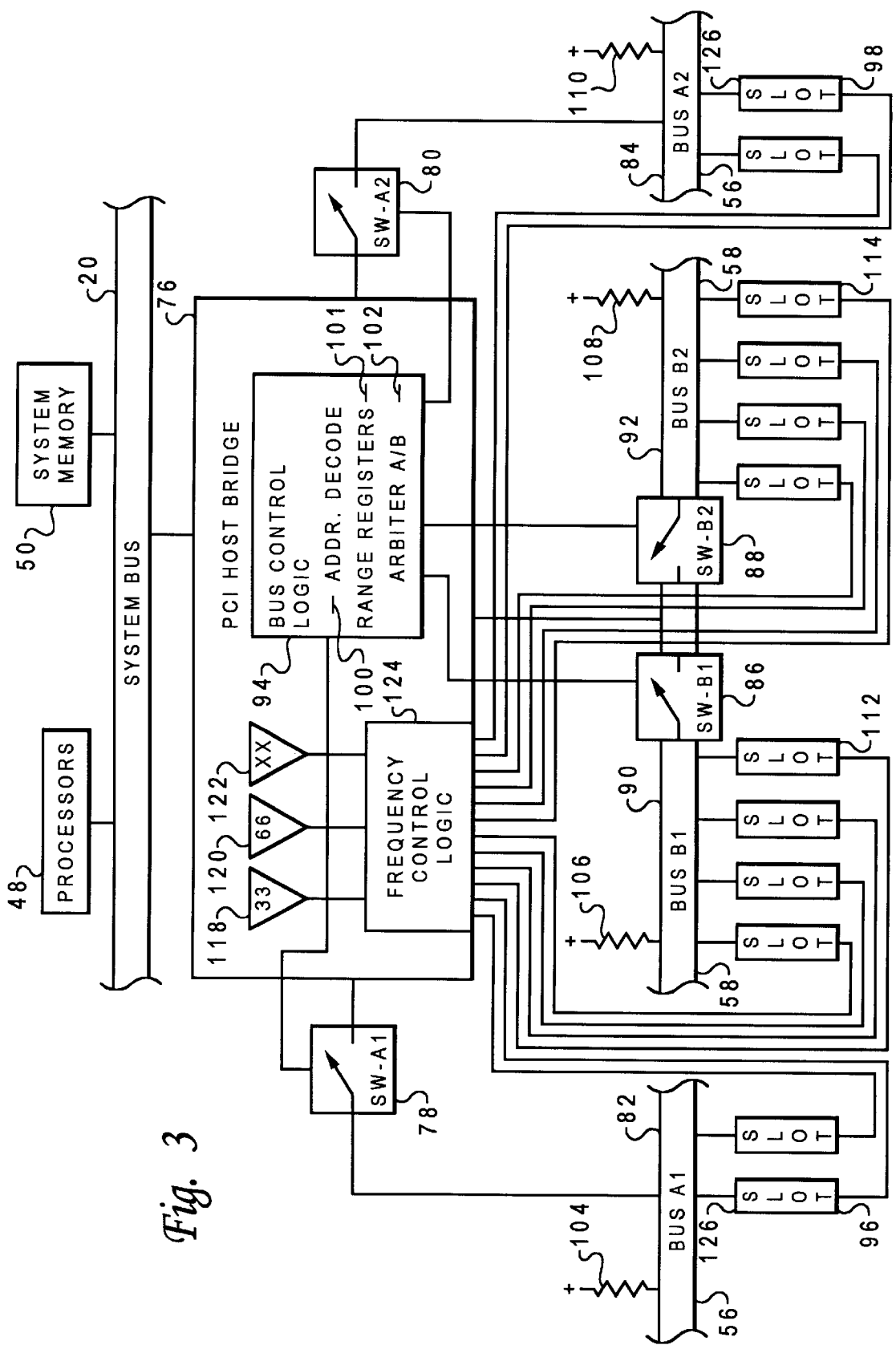
FIG. 3 is a block diagram of a PCI host bridge having bus and frequency control logic and bus clocks for supporting PCI local buses in accordance with a preferred embodiment of the present invention.

Referring now to FIG. 3, there is illustrated a block diagram of a PCI host bridge 76 in accordance with the preferred embodiment of the present invention. As shown, PCI host bridge 76 may support a plurality of PCI local buses at different bus frequencies, namely, PCI local bus A 56 and PCI local bus B 58. As shown in FIG. 3, two sets of in-line electronic switches are provided for each PCI bus thereby providing bus segments for allowing more than four PCI devices to be utilized on a given bus as defined by the PCI local bus standard. These sets of in-line electronic switches additionally provide the switching mechanism for all of the appropriate PCI signals associated with PCI buses for isolation on the buses as will be more fully described below.

Referring once again to FIG. 3, two sets of in-line electronic switches SW-B1 86 and SW-B2 88 are included along PCI local bus B 58 creating PCI local bus segments B1 90 and B2 92, respectively, for operating at a bus frequency up to 33 MHz. In accordance with the PCI specification, the bus loading design requirements for the PCI local bus B 58 are normally ten loads for a maximum frequency of up to 33 MHz. Attaching a PCI slot to the PCI bus B 58 presents itself as two loads, attaching a soldered load to the PCI bus B 58 presents itself as one load. As shown in FIG. 3, local bus segments B1 90 and B2 92, respectively, each have attached four peripheral component slots 112 and 114 for a total of eight loads on each bus segment. The host bridge 76 adds one load and open switches on the other bus segment, PCI local bus A 56, as will be more fully described below, add one more additional load, for a total of ten loads on each local bus segment B1 90 and B2 92.

As shown in FIG. 3, the PCI local bus segments B1 90 and B2 92 each support four PCI peripheral component slots 112 and 114 (add-in board connectors) for receiving PCI devices, not shown. It should be understood that in order to meet the ten load requirement that at any one time only one set of switches may be closed on PCI local bus B 58 producing a total of ten loads. Therefore, the opening and closing of switches SW-B1 86 and SW-B2 88 effectively isolate the PCI local bus B 58 from the local effects of the segments and the four added peripheral component slots behind the open switches allows eight slots to be utilized on PCI local bus B 58, thereby eliminating the need for the second PCI host bridge 54 shown in FIG. 2.

Turning once again to FIG. 3, two sets of in-line electronic switches SW-A1 78 and SW-A2 80 are included along PCI local bus A 56 creating PCI local bus segments A1 82 and A2 84, respectively for operating at a bus frequency up to 66 MHz. As noted above, the bus loading design requirements for the PCI local bus A 56 are normally six loads for a maximum frequency of up to 66 MHz at 66 MHz of operation. Once again, attaching a PCI slot to the PCI bus A 56 presents itself as two loads. As shown in FIG. 3, local bus segments A1 82 and A2 84 respectively, each have attached two peripheral component slots 96 and 98 for a total of four loads on each bus. The host bridge 76 adds one load and open switches SW-B1 86 and SW-B2 88 on PCI local bus B 58 add one more additional load, for a total of approximately six loads on each PCI local bus segments A1 82 and A2 84, respectively. As discussed above, open switches SW-A1 78 and SW-A2 80 adds an additional approximate load on PCI local bus A 56. The two peripheral component slots 96 and 98 on each side of PCI local bus segments A1 82 and A2 84 when either switch SW-A1 78 and SW-A2 80 is closed presents six loads.

As shown in FIG. 3, the PCI local bus segments A1 82 and A2 84 each support two PCI peripheral component slots 96 and 98 (add-in board connectors) for receiving PCI devices. It should be understood that in order to meet the six load requirement that at any one time only one set of switches may be closed on PCI local bus A 56. Therefore, the opening and closing of switches SW-A1 78 and SW-A2 80 effectively isolate the PCI local bus A 56 from the local effects of the segments and the two added peripheral component slots behind the open switches allows four slots to be utilized on PCI local bus A 56. Additionally, a single pull double throw switch may also replace the two sets of in-line electronic switches. With this configuration, twelve peripheral component slots are supported by each PCI host bridge.

Referring once again to FIG. 3, The PCI host bridge 76 includes bus control logic 94 having an address decode 100, range registers 101 and an arbiter control 102 for controlling the sequence of turning "on" an "off" the switches SW-A1 78, SW-A2 80, SW-B1 86 and SW-B2 88, respectively, during bus operation. In the preferred embodiment of the invention, the PCI host bridge 76 includes a plurality of bus clocks and frequency control logic 124 designed to provide each PCI clock frequency, 33 MHz 118, 66 MHz 120 and one or more higher MHz clock frequencies 122 to the buses. As shown in FIG. 3, since each PCI peripheral component slot is required to have its own unique PCI clock signal (current PCI requirement), the added control logic 124 for each segment 82, 84, 90 and 92, respectively, on a given PCI bus segment can be operated at a different frequency than the other segments. As mentioned before, when using either PCI local bus A 56 or bus B 58, only one set of switches, SW-A1 78 and SW-A2 80 or SW-B1 86 and SW-B2 88 are closed at a time, depending on where a master and where a target is during bus operation on either bus A 56 or bus B 58.

By way of example, but not of limitation, the frequency control logic 124 included in PCI host bridge 76 for determining the bus frequency of operation for local bus A 56 and local bus B 58 will be described. When the computer system is first booted up, the frequency for the PCI bus lines is initially established. More specifically, the frequency control logic 124 will select the appropriate frequencies of operation for each bus by polling the PCI peripheral component slots in accordance with the frequency selection protocol defined in the PCI specification. Once the frequency is established, the appropriate bus clocks, 118, 120 or 122 are dedicated to that bus line for the rest of the systems operation. By way of example, PCI local bus B 58 will receive signals from bus clock 118 for 33 MHz of operation and PCI local bus A 56 will receive signals from bus clock 120 for 66 MHz of operation. Likewise, the clock frequencies for bus segment B1 90 and bus segment B2 92 will receive 33 MHz signals from bus clock 118 and bus segment A1 82 and bus segment A2 84 will receive 66 MHz signals from bus clock 120. The situation for higher frequencies will be more fully discussed below.

By way of example, but not of limitation, the bus control logic 94 for bus A 56 will be described. The arbiter 102 for bus A 56 determines where a winning master is on the bus 56. If the current controlling master is say on bus segment A1 82, then the switch SW-A1 78 is closed and switch SW-A2 80 is open when that master gains control of bus segment A1. If the operation is DMA (Direct Memory Access) to system memory 50 through the system bus 20, then the target is the host bridge 76. If the next winning arbiter is on segment A2 84, the grant line (GNT#) is removed from the master on segment A1 82, and when its latency timer expires, it gets off the bus 56 resulting in a idle cycle on the bus 56. When the bus 56 goes idle, switch SW-A1 78 is open, and SW-A2 80 is closed, and the GNT# is activated to the winning master waiting on segment A2 84. When the winning master in segment A2 84 sees its GNT# line active on the bus 56 plus an idle bus, it begins its Direct Memory Access (DMA) toward system memory 50. It should be noted that the request line (REQ#) and GNT# lines (not shown) are not bused, and therefore not switched by the in-line switches SW-A1 78 and SW-A2 80. Although not described, it should be recognized that the equivalent bus control logic 94 discussed above is also provided for the in-line electronic switches SW-B2 86 and SW-B2 88 inserted along PCI local bus B 58.

Continuing from above and referring once again to FIG. 3, if the winning arbiter 102 is the PCI host bridge 76 for PCI local bus A 56, the address decode 100 and address range registers 101 in the bus controller 94 (for bus A) located in the PCI host bridge 76 is used to find the target the PCI host bridge 76 wants to access. This address decode 100 and address range registers 101 functions are handled in parallel with the arbitration 102 described above. Once a target is located, then the PCI host bridge 76 will know which set of in-line switches SW-A1 78 and SW-A2 80 need to be closed to connect the PCI host bridge 76 to the correct target. If the next target is on the same bus segment as the current controlling master, the switch states will not change until bus control is granted to the next controlling master. The address decode 100 is done to locate the target when the PCI host bridge 76 arbitrates for the PCI local bus A 56, in case the bridge wins the arbitration. When the current controlling master is on segment A1 82, the winning arbiter 102 is the PCI host bridge 76, and the target is on segment A2 84, the GNT# is removed from the master on segment A1 82, and when its latency timer expires, it gets off the PCI local bus 56 resulting in an idle cycle on the PCI local bus 56. When the PCI local bus 56 goes idle, switch SW-A1 78 is open and switch SW-A2 80 is closed and the PCI host bridge 76 now begins its access to the target on PCI local bus segment A2 84. Although not described, it should be recognized that the equivalent bus control logic 94 discussed above is also provided for the in-line electronic switches SW-B1 86 and SW-B2 88 inserted along PCI local bus B 58.

Turning once again to FIG. 3, for local bus segments A1 82 and A2 84 there are attached pull-up resistors 104 and 110 located on the slot 96 and 98 sides of the switches 78 and 80. Similarly, for local bus segments B1 90 and B2 92 there are attached pull-up resistors 106 and 108 located on the slot 112 and 114 sides of the switches 86 and 88. Additionally, more than two bus segments per PCI bus may be separated by sets of in-line switches as long as the total bus loading requirements and timing budgets are met for a given frequency of operation.

For operation at frequencies higher than 66 MHz different methodologies for use by the frequency control logic 124 within the PCI host bridge 76 will be discussed. In a preferred embodiment adapters 126 in slots 96 and 98 indicate higher than 66 MHz of bus operation. These adapters 126 use a pin similar to that used for determining 66 MHz of bus operation by using a currently reserved pin similar to the M66EN pin used for determining 66 MHz. If the new pin were GNDed, that would indicate that the adapters 126 are capable of higher than 66 MHz operation. Another embodiment is to use a configuration bit to indicate that the adapters 126 can operate higher than 66 MHz, but also provide the M66EN to indicate 66 MHz capability. The PCI local bus A 56 is initially started at 66 MHz (if the M66EN line on the segment has not been GNDed) during configuration, and then if it is discovered during configuration that the adapters 126 can operate higher than 66 MHz on the bus segments 82 and 84 then configuration code could be utilized to reset the bus segments 82 and 84 and then restart the bus segments 82 and 84 and associated clock at the higher determined bus frequency.

Again referring to FIG. 3, if adapters 126 which are capable of operating at a frequency above 66 MHz and are both installed on bus segment A1, then that segment is capable of operation at a frequency greater than 66 MHz (such as say 100 MHz). If adapters installed in slots on bus segment A2 are capable of operation at 66 MHz, then that bus segment can be operated at 66 MHz. In a preferred embodiment, the PCI host bridge 76 is capable of dynamically switching its frequency of operation between the higher frequency, such as 100 MHz, and 66 MHz operation on bus 56. When a master on bus segment A1 gains control of the bus and the target is the host bridge 76, then the master and the host bridge will both operate at the higher bus frequency of say 100 MHz. If the next master to gain control of the bus is on bus segment A2 and the target is again the host bridge, then the host bridge will dynamically switch to the 66 MHz frequency of operation. Thus, the PCI bus 56 can dynamically switch its frequency of operation dependent on the location of the controlling master and the master's selected target. The in-line switches SW-A1 and SW-A2 provide the isolation to allow the different bus segments A1 and A2 to be dynamically switched between different operating frequency, though they are the same logical bus.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:
   a system bus connected to a processor and a system memory;
   a plurality of local buses defined by a first and second set of in-line electronic switches, wherein said first set of in-line electronic switches defines a first local bus segment and wherein said second set of in-line electronic switches defines a second local bus segment;
   a host bridge for connecting said plurality of local buses to said system bus wherein said host bridge includes frequency control logic for selecting a bus clock for each of said plurality of local buses from a plurality of bus clocks having different frequencies; and
   a plurality of peripheral component slots connected to said plurality of local buses, wherein at least one said peripheral component slot shares data with said processor and said system memory.

2. The computer system according to claim 1, wherein when said frequency control logic determines that said first and said second local bus segments are at a bus frequency of up to 33 MHz, a 33 MHz bus clock defined by said plurality of bus clocks operates said first local bus segment to support up to four peripheral component slots and operates said second local bus segment to support up to four peripheral component slots wherein when one said set of in-line electronic switches are closed the other said set of in-line electronic switches are open.

3. The computer system according to claim 2, wherein said host bridge includes bus control logic, said bus control logic including address decode, range registers and arbiter control for determining when said first and said second sets of in-line switches are open and closed depending on where a master and a target is on said first and said second local bus segments.

4. The computer system according to claim 1, wherein when said frequency control logic determines that said first and said second local bus segments are at a bus frequency of up to 66 MHz, a 66 MHz bus clock defined by said plurality of bus clocks operates said first local bus segment to support up to two peripheral component slots and operates said second local bus segment to support up to two peripheral component slots wherein when one said set of in-line electronic switches are closed the other said set of in-line electronic switches are open.

5. The computer system according to claim 2, wherein said second local bus includes third and fourth sets of in-line electronic switches, said third set of in-line electronic switches defining a third local bus segment and said fourth set of in-line electronic switches defining a fourth local bus segment.

6. The computer system according to claim 5, wherein when said frequency control logic determines that said third and said fourth local bus segments are at a bus frequency of up to 66 MHz, a 66 MHz bus clock defined by said plurality of bus clocks operates said third local bus segment to support up to two peripheral component slots and operates said fourth local bus segment to support up to two peripheral component slots wherein when one said set of in-line electronic switches are closed the other said set of in-line electronic switches are open.

7. The computer system according to claim 6, wherein said host bridge includes bus control logic, said bus control logic including address decode, range registers and arbiter control for determining when said first, second, third and fourth sets of in-line electronic switches are open and closed depending on where a master and a target is on said first second, third and fourth local bus segments wherein only four said peripheral component slots from said first local bus and two said peripheral component slots from said second local bus are electrically connected to a bus at any given time.

8. The computer system according to claim 1, wherein during configuration, adapters located on said plurality of peripheral component slots connected to said plurality of local buses are polled by said frequency control logic to determine bus frequencies of said plurality of local buses and start the associated plurality of bus clocks.

9. The computer system according to claim 1, wherein when said frequency control logic determines that said first and said second local bus segments are at a bus frequency of up to 100 MHz, a 100 MHz bus clock defined by said plurality of bus clocks operates said first local bus segment to support up to two peripheral component slots and operates said second local bus segment to support up to two peripheral component slots wherein when one said set of in-line electronic switches are closed the other said set of in-line electronic switches are open.

10. The computer system according to claim 5, wherein when said frequency control logic determines that said third and said fourth local bus segments are at a bus frequency of up to 100 MHz, a 100 MHz bus clock defined by said plurality of bus clocks operates said third local bus segment to support up to two peripheral component slots and operates said fourth local bus segment to support up to two peripheral component slots wherein when one said set of in-line electronic switches are closed the other said set of in-line electronic switches are open.

11. The computer system according to claim 1, wherein after configuration, said Host Bridge connected to said plurality of local buses is controlled by said frequency control logic to dynamically switch frequency of operation of said Host Bridge between 66 MHz and 100 MHz based on location of a controlling master and selected target and mutual maximum frequency.

12. A method for supporting multiple buses within a data-processing system, said method comprising the steps of:
connecting a processor and a system memory to a system bus;
connecting a plurality of local buses to said system bus via a host bridge;
connecting more than one set of in-line electronic switches along said plurality of local buses;
connecting at least one peripheral component slot to said plurality of local buses, wherein at least one said peripheral component slot shares data with said processor and said system memory by opening and closing said set of in-line electronic switches; and
selecting bus frequencies from a plurality of bus frequencies for said plurality of local buses using frequency control logic within said host bridge and enabling associated bus clocks within said host bridge.

13. The method according to claim 12, said method further includes the step of inserting first and second sets of in-line electronic switches along a first local bus defined by said plurality of local buses, said first set of in-line electronic switches defining a first local bus segment and said second set of in-line electronic switches defining a second local bus segment.

14. The method according to claim 13, said method further includes the step of attaching up to four peripheral component slots to said first local bus segment and attaching up to four peripheral component slots to said second local bus segment when said data-processing system is operating up to 33 MHz as determined by said frequency control logic wherein when one said set of in-line electronic switches are closed the other said set of in-line electronic switches are open.

15. The method according to claim 14, said method further includes the step of opening and closing said first and said second sets of in-line electronic switches in accordance with bus control logic within said host bridge, said bus control logic including address decode, range registers and arbiter control for determining where a master and a target is on said first and said second local bus segments wherein only four said peripheral component slots are electrically connected to said bus at a given time when said system is operating up to 33 MHz.

16. The method according to claim 13, said method further includes the step of attaching up to two peripheral component slots to said first local bus segment and attaching up to two peripheral component slots to said second local bus segment wherein when one said set of in-line electronic switches are closed the other said set of in-line electronic switches are open when said system is operating up to 66 MHz as determined by said frequency control logic.

17. The method according to claim 16, said method further includes the step of connecting a second local bus to said system via said host bridge and inserting third and fourth sets of in-line electronic switches along said second local bus, said third set of in-line electronic switches defining a third local bus segment and said fourth set of in-line electronic switches defining a fourth local bus segment.

18. The method according to claim 17, said method further includes the step of attaching up to four peripheral component slots to said third local bus segment and attaching up to four peripheral component slots to said fourth local bus segment when said frequency control logic determines up to 33 MHz operation and starts the associated said bus clock, wherein when one said set of in-line electronic switches are closed the other said set of in-line electronic switches are open.

19. The method according to claim 18, said method further includes the step of opening and closing said first, second, third and fourth sets of in-line electronic switches in accordance with bus control logic within said host bridge, said bus control logic including address decode, range registers and arbiter control for determining when said first, second, third and fourth sets of in-line electronic switches are open and closed depending on where a master and a target is on said first second, third and fourth local bus segments wherein only four said peripheral component slots from said first local bus and two said devices from said second local bus are electrically connected to a bus at a given time.

20. The method according to claim 19, said method further includes the step of inserting pull-up resistors along said first, second, third and fourth local bus segments.

21. A computer system having local buses comprising:

a system bus connected to a processor and a system memory;

a host bridge including frequency control logic and a plurality of bus clocks;

a first local bus connected to said system bus via said host bridge, said first local bus includes first and second sets of in-line electronic switches, said first set of in-line electronic switches defining a first local bus segment and said second set of in-line electronic switches defining a second local bus segment;

said frequency control logic determining that said first and said second local bus segments are at a bus frequency of up to 33 MHz, a 33 MHz bus clock defined by said plurality of bus clocks operates said first local bus segment to support up to four peripheral component slots and operates said second local bus segment to support up to four peripheral component slots wherein when one said set of in-line electronic switches are closed the other said set of in-line electronic switches are open;

a second local bus connected to said system bus via said host bridge, said second local bus includes third and fourth sets of in-line electronic switches, said third set of in-line electronic switches defining a third local bus segment and said fourth set of in-line electronic switches defining a fourth local bus segment;

said frequency control logic determining that said third and said fourth local bus segments are at a bus frequency defined by said plurality of bus clocks operates said third local bus segment to support up to two peripheral component slots and operates said fourth local bus segment to support up to two peripheral component slots wherein when one said set of in-line electronic switches are closed the other said set of in-line electronic switches are open, each bus segment may be operated at 66 MHz and 100 MHz intended on adapters installed, said Host Bridge dynamically switching frequency as appropriate; and said host bridge includes bus control logic, said bus control logic including address decode, range registers and arbiter control for determining when said first, second, third and fourth sets of in-line electronic switches are open and closed depending on where a master and a target is on said first second, third and fourth local bus segments wherein only four said peripheral component slots from said first local bus and two said peripheral component slots from said second local bus are electrically connected to a bus at a given time when said computer system is operating up to 33 MHz and 66 MHz, or higher.

* * * * *